UNITED STATES PATENT OFFICE.

ANSON G. BETTS, OF ASHEVILLE, NORTH CAROLINA.

PRODUCTION OF ALUMINA.

1,300,110. Specification of Letters Patent. Patented Apr. 8, 1919.

No Drawing. Application filed February 9, 1918 Serial No. 216,343.

*To all whom it may concern:*

Be it known that I, ANSON G. BETTS, a citizen of the United States, residing at Asheville, in the county of Buncombe and State of North Carolina, have invented certain new and useful Improvements in the Production of Alumina, of which the following is a full, clear, and exact description.

The invention that forms the subject of the present application relates to the production of alumina. Heretofore alumina has been produced most cheaply and conveniently from the material known as "bauxite" by treatment with caustic soda solution, the resulting solution of sodium aluminate being suitably treated, for example, with carbonic acid, to precipitate aluminum hydrate. The object of my present invention is to provide a simple and effective but withal a cheap process which will permit the use of aluminous materials other than bauxite, as for example, clay.

In carrying out the invention in the preferred manner the aluminous material, for instance kaolin, is mixed with a solution of ammonium fluorid. This mixture is strongly heated, preferably boiled, causing evolution of ammonia ($NH_3$) mixed with water vapor, and producing aluminum fluorid which goes into solution. The reaction appears to be

$$Al_2O_3 + 6NH_4F = 2AlF_3 + 6NH_3 + 3H_2O.$$

To economize heat the boiling of the mixture of aluminous material and ammonium fluorid is performed preferably in multiple-effect vacuum evaporators. Apparatus and procedure suitable for such purpose are well known and hence need not be described herein. In this operation I may employ, to one ton of dry clay, 140 gallons of 10 per cent. solution of $NH_4F$, and the liquor may be boiled until, say, 85 per cent. of the total ammonia content has distilled over. During the distillation water to the amount of, say 75 gallons, may be added, or an equivalent amount of steam may be blown into the mixture.

The ammonia and the water vapor during the boiling are received together in any suitable condensing apparatus, and are condensed to a solution of ammonia in water. I find that if the operation is so conducted as to produce a condensate containing about 5 per cent. of the $NH_3$ the operation is efficient. The ammonia solution may be redistilled to produce a stronger solution of ammonia for use subsequently in precipitating alumina (that is, the hydrated oxid) from the aforesaid aluminum fluorid solution.

The aluminum fluorid is separated (after the boiling operation) from the insoluble residue, as by filtration, and after cooling (for example at atmospheric temperature) is treated with ammonia, which precipitates hydrated alumina and leaves a solution of ammonium fluorid which is used for treating a fresh quantity of raw material.

It will be observed that the process is cyclical; also that there is practically no consumption of chemicals beyond that caused by mechanical losses and such subordinate reactions as may take place with other constituents of the material treated. These reactions usually occur on a very minor scale if at all.

I believe the following is the correct explanation of the process:

When the kaolin or clay, etc., to be treated for the extraction of alumina, is mixed with ammonium fluorid solution there is established a reversible reaction, as for example:

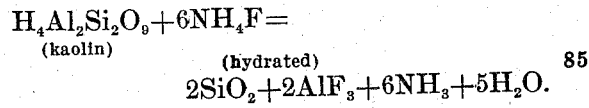
$$H_4Al_2Si_2O_9 + 6NH_4F =$$
(kaolin)
$$2SiO_2 + 2AlF_3 + 6NH_3 + 5H_2O.$$
(hydrated)

By boiling the mixture $NH_3$ is continuously removed with the water vapor (condensing to aqueous ammonia) and the reaction is carried on to substantial completion from left to right as written above according to a well known principle of chemical equilibrium. There is an excess of ammonium fluorid in the solution, which excess may amount to 10 to 20 per cent. of the total amount used.

The ammonium fluorid solution may be separated from the silica and other insoluble matter, for example by filtration. The ammonia produced in the above reaction may now be added to the solution of aluminum fluorid, the ammonia being preferably first concentrated by distilling the aforesaid aqueous ammonia and conducting the vapor or condensate in concentrated form into the cooled aluminum fluorid solution at or above atmospheric pressure. There is then established the reversible reaction:

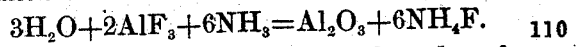
$$3H_2O + 2AlF_3 + 6NH_3 = Al_2O_3 + 6NH_4F.$$

In this case the operation is conducted preferably at a temperature considerably below the boiling temperature and the ammonia is present in high concentration instead of being removed by boiling as fast as formed as in the first reaction, so that the reaction is forced to proceed from left to right as written or in opposite direction (chemically) to the first reaction.

Any aluminum fluorid and ammonia remaining in solution, after separation, may be merely returned to the system, thereby minimizing loss of material.

In carrying out the above reversible reaction the first stage is conducted under one or more conditions capable of liberating ammonia, for example, heat or vacuum or both. The second stage is conducted under conditions capable of retaining the excess of ammonia, for example cold or pressure or both.

The process is also available for treating minerals containing potash as well as alumina. In such case potassium fluorid is produced along with the aluminum fluorid and is, after precipitation of the latter, recovered as a marketable potassium salt by any suitable method.

Of course, the ammonia distilled from the boiling mixture can be converted into carbonate and the latter used to precipitate the alumina in the well understood way.

What I claim is:

1. The process of decomposing aluminous materials, comprising heating the material with a solution of ammonium fluorid, sufficiently to remove ammonia by evaporation and produce aluminum fluorid in solution.

2. The process of preparing alumina from aluminous materials, comprising heating an insoluble aluminous material also containing non-volatile material other than alumina with a solution of ammonium fluorid, sufficiently to remove ammonia by evaporation and produce aluminum fluorid in solution.

3. The process of preparing aluminum hydrate from aluminous materials, comprising treating the material with water containing ammonium fluorid, to produce aluminum fluorid in solution, removing the resulting ammonia by evaporation, and precipitating alumina from the aluminum fluorid solution.

4. The process of preparing alumina from aluminous materials, comprising decomposing the material with ammonium fluorid in solution, thereby producing ammonia and aluminum fluorid in solution, and bringing said two products together in such proportions as to precipitate aluminum hydrate.

5. The cyclical process of preparing alumina from aluminous materials, comprising boiling the material in a water solution of ammonium fluorid, whereby ammonia is evolved and aluminum fluorid is produced in solution, collecting the ammonia, and treating with the ammonia collected the solution of aluminum fluorid to precipitate alumina and produce ammonium fluorid in solution, and separating the precipitated alumina and the solution of ammonium fluorid whereby the latter may be used to treat fresh material.

6. The cyclical process of preparing alumina from aluminous material comprising treating the material with a solution of ammonium fluorid and subjecting the same to evaporation to produce ammonia and aluminum fluorid in solution, collecting the ammonia and treating therewith the aforesaid aluminum fluorid in solution to precipitate alumina and produce substantially the original quantity of ammonium fluorid solution, and treating fresh material with the last-mentioned solution.

7. The process of decomposing aluminous materials, comprising treating the material with ammonium fluorid in solution to produce ammonia and aluminum fluorid, and removing the ammonia so produced.

8. The process of treating materials containing aluminum and potassium, comprising treating the material with ammonium fluorid to produce aluminum fluorid and potassium fluorid in solution, with evolution of ammonia, and precipitating and separating alumina and a potassium compound from the solution.

9. A process of producing alumina from an insoluble material containing the same, which comprises boiling the said material with a solution of fluorid of a volatile base, thereby driving off said volatile base, separating the solution from the undissolved material, and adding the volatile base to the said solution.

10. A cyclic process which comprises producing a mixture of an insoluble aluminous material and a solution of ammonium fluorid, distilling ammonia therefrom, thereby producing a solution containing aluminum fluorid, separating said solution from the undissolved residue and returning the ammonia thereto.

11. In the process of producing alumina from an insoluble aluminous material, the step of digesting said materials, at an elevated temperature, with a reagent capable of producing by reaction on said aluminous material, a solution of an aluminum compound, and of simultaneously liberating a volatile base which, when added to such solution, is capable of reprecipitating alumina therefrom.

In testimony whereof I hereunto affix my signature.

ANSON G. BETTS.